(12) United States Patent
Cao et al.

(10) Patent No.: US 11,943,106 B2
(45) Date of Patent: Mar. 26, 2024

(54) SUPERVISED TRAFFIC MANAGEMENT IN SigMesh NETWORKS

(71) Applicant: QUALCOMM Incorporated, San Diego, CA (US)

(72) Inventors: Jianlong Cao, Shanghai (CN); Ravi Kiran Bamidi, Bangalore (IN); Yusheng Yang, Shanghai (CN); Huafen Lv, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/290,671

(22) PCT Filed: Nov. 9, 2018

(86) PCT No.: PCT/CN2018/114744
§ 371 (c)(1),
(2) Date: Apr. 30, 2021

(87) PCT Pub. No.: WO2020/093350
PCT Pub. Date: May 14, 2020

(65) Prior Publication Data
US 2022/0021579 A1 Jan. 20, 2022

(51) Int. Cl.
*H04L 41/0816* (2022.01)
*H04L 41/083* (2022.01)
(Continued)

(52) U.S. Cl.
CPC ........ *H04L 41/0816* (2013.01); *H04L 41/083* (2013.01); *H04L 41/12* (2013.01);
(Continued)

(58) Field of Classification Search
CPC ............... H04L 41/0816; H04L 41/083; H04L 43/062; H04L 43/10; H04L 41/12;
(Continued)

(56) References Cited

U.S. PATENT DOCUMENTS 6,728,781 B1 * 4/2004 Aguilera ................. H04L 43/10
709/201
8,809,492 B2 8/2014 Ramstack et al.
(Continued)

FOREIGN PATENT DOCUMENTS

CN 101582836 A 11/2009

OTHER PUBLICATIONS

Supplementary European Search Report—EP18939280—Search Authority—The Hague—dated May 20, 2022.
Taiwan Search Report—TW108137671—TIPO—dated Nov. 4, 2022.
International Search Report and Written Opinion—PCT/CN2018/114744—ISA/EPO—dated Aug. 14, 2019.

*Primary Examiner* — Michael A Keller
(74) *Attorney, Agent, or Firm* — MG-IP Law, P.C.

(57) ABSTRACT

Systems and methods of managing a Bluetooth SigMesh network involve a supervisor configured to monitor one or more network parameters of the SigMesh network, such as topology, message identity, transmit count, transmit interval, relay retransmit count, or relay retransmit interval. The supervisor determines whether one or more of the network parameters are to be adjusted for improving transmission efficiency, reducing traffic congestion, avoiding flooding of packets on the mesh network, or ensuring injection of packets in the SigMesh network. The supervisor provides feedback to one or more nodes with the adjusted network parameters to improve transmission efficiency and reduce traffic in the SigMesh network.

23 Claims, 6 Drawing Sheets

(51) Int. Cl.
  *H04L 41/12* (2022.01)
  *H04L 43/062* (2022.01)
  *H04L 43/0817* (2022.01)
  *H04L 43/10* (2022.01)
  *H04L 47/122* (2022.01)

(52) U.S. Cl.
  CPC ........ *H04L 43/062* (2013.01); *H04L 43/0817* (2013.01); *H04L 43/10* (2013.01); *H04L 47/122* (2013.01)

(58) Field of Classification Search
  CPC ................ H04L 43/081; H04L 47/122; H04L 43/0817; H04L 43/0894; H04L 41/0836; H04L 43/08; H04L 47/12; H04W 84/18
  See application file for complete search history.

(56) References Cited

U.S. PATENT DOCUMENTS

| | | | |
|---|---|---|---|
| 8,943,352 B1* | 1/2015 | Warneke | G06F 1/3234 331/46 |
| 9,137,341 B1* | 9/2015 | Bagchi | H04L 43/0847 |
| 2007/0127380 A1* | 6/2007 | Abraham | H04L 47/286 370/252 |
| 2007/0133532 A1* | 6/2007 | Venkatraman | H04L 12/18 370/432 |
| 2008/0056125 A1 | 3/2008 | Kneckt et al. | |
| 2010/0302945 A1 | 12/2010 | Leppanen et al. | |
| 2017/0317906 A1* | 11/2017 | Tsai | H04L 43/0847 |
| 2018/0234302 A1* | 8/2018 | James | G06N 20/00 |
| 2018/0375846 A1* | 12/2018 | Heydon | H04W 12/106 |

* cited by examiner

SUPERVISED TRAFFIC MANAGEMENT IN SigMesh NETWORKS

CROSS-REFERENCE TO RELATED APPLICATIONS

The present application claims priority to International Application No. PCT/CN2018/114744, filed Nov. 9, 2018, which is herein incorporated by reference in its entirety.

FIELD OF DISCLOSURE

Disclosed aspects are directed to managing traffic in mesh networks. More specifically, exemplary aspects are directed to systems and methods for supervising traffic and improving efficiency while reducing congestion in Bluetooth Special Interest Group mesh (SigMesh) networks.

BACKGROUND

Wireless communication networks may include Bluetooth mesh networks (hereinafter, more generally, mesh networks). Specifically, the Bluetooth Special Interest Group mesh network (SigMesh network) provides the capability for many-to-many (m:m) device communications and is optimized for creating large-scale device networks. The Bluetooth SigMesh network is suited for example, in applications such as building automation, sensor networks and other internet of things (IoT) solutions wherein tens, hundreds, or thousands of devices need to reliably and securely communicate with one another.

In mesh networks, for example the big mesh network deployments such as the Bluetooth SigMesh networks, traffic performance metrics of the mesh network, such as throughput and message latency are important for improving and maintaining desirable user experience. With the number of devices connected to the mesh networks and the amount of data being transmitted on the rise, the message traffic on the mesh network is also on the rise.

In some implementations, devices on network nodes may flood the network with messages to be transmitted (e.g., because conventional SigMesh deployments do not have complex routing algorithms) in an effort to improve chances of the messages being relayed to target nodes. To prevent such flooding, the SigMesh networks may utilize message caches to detect duplicate messages and prevent them from being relayed redundantly in the case of devices attempting to flood the mesh networks.

Further, in SigMesh network deployments using Bluetooth low energy (BLE) bearers, for example, messages may be sent and received in one of three advertising channels. However, there is no built-in carrier/channel sensing capability in the SigMesh networks, which means that the messages sent on the different channels may collide. There is also no acknowledgement required in conventional deployments when messages are received by the target nodes, so the transmitting nodes may not know whether the transmitted messages were correctly delivered or if they were lost due to collisions. In an effort to avoid or minimize the collisions, the transmitting nodes may add random message lags and repeat the messages after back-off periods, which also lead to increased unpredictability in the network traffic and increased congestion.

Correspondingly, it is seen that parameters such as the number of times a message is transmitted from a transmitting node (or the "transmit count"), the time interval between successive transmissions from the transmitting node (or the "transmit interval"), the number of times a message is retransmitted by a relay node (or the "relay retransmit count"), the time interval between successive retransmissions by the relay node (or the "relay retransmit interval"), etc., influence the traffic congestion.

The above parameters are typically specified by a vendor, and are not dynamically adaptable or configurable to address real time traffic congestions as they develop. For example if the transmit count is set too small, and a target node is surrounded by many nodes, the messages may collide and fail to be injected into the network. However, while increasing the transmit count can improve injection into the network, it also increases noise. Similarly, relay counts being too low or too high can also affect injection into the network and noise.

Accordingly, there is a need for real time traffic management techniques which can improve the above parameters, for example, to increase the message reliability and reduce the message redundancy.

SUMMARY

Exemplary aspects of the invention are directed to systems and methods for managing a Bluetooth SigMesh network. A supervisor is configured to monitor one or more network parameters of the SigMesh network, such as topology, message identity, transmit count, transmit interval, relay retransmit count, or relay retransmit interval. The supervisor determines whether one or more of the network parameters are to be adjusted for improving transmission efficiency, reducing traffic congestion, avoiding of flooding of packets on the SigMesh network, or ensuring injection of packets in the SigMesh network. The supervisor provides feedback to one or more nodes with the adjusted network parameters to improve transmission efficiency and reduce traffic in the SigMesh network.

For example, an exemplary aspect is directed to method of managing a mesh network, the method comprising monitoring, at a supervisor of the mesh network, one or more network parameters of the mesh network and determining, whether one or more of the network parameters are to be adjusted for improving transmission efficiency or reducing traffic congestion on the mesh network. The method further comprises providing feedback to one or more nodes with the adjusted network parameters.

Another exemplary aspect is directed to an apparatus configured to manage a mesh network, the apparatus comprising control logic configured to transmit packets on to the mesh network based on one or more network parameters, and a supervisor of the mesh network configured to monitor one or more network parameters of the mesh network based on the packets transmitted on to the mesh network, and determine whether one or more of the network parameters are to be adjusted. The apparatus further comprises a feedback path to the control logic with the adjusted network parameters.

Yet another exemplary aspect is directed to an apparatus comprising means for monitoring one or more network parameters of a mesh network, means for determining, whether one or more of the network parameters are to be adjusted for improving transmission efficiency or reducing traffic congestion on the mesh network, and means for providing feedback to one or more nodes with the adjusted network parameters.

Yet another exemplary aspect is directed to a non-transitory computer-readable storage medium comprising code, which, when executed by a processor, causes the processor to perform operations for managing a mesh network, the non-transitory computer-readable storage medium comprising code for monitoring, at a supervisor of the mesh network, one or more network parameters of the mesh network, code for determining, whether one or more of the network parameters are to be adjusted for improving transmission efficiency or reducing traffic congestion on the mesh network, and code for providing feedback to one or more nodes with the adjusted network parameters.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1A:
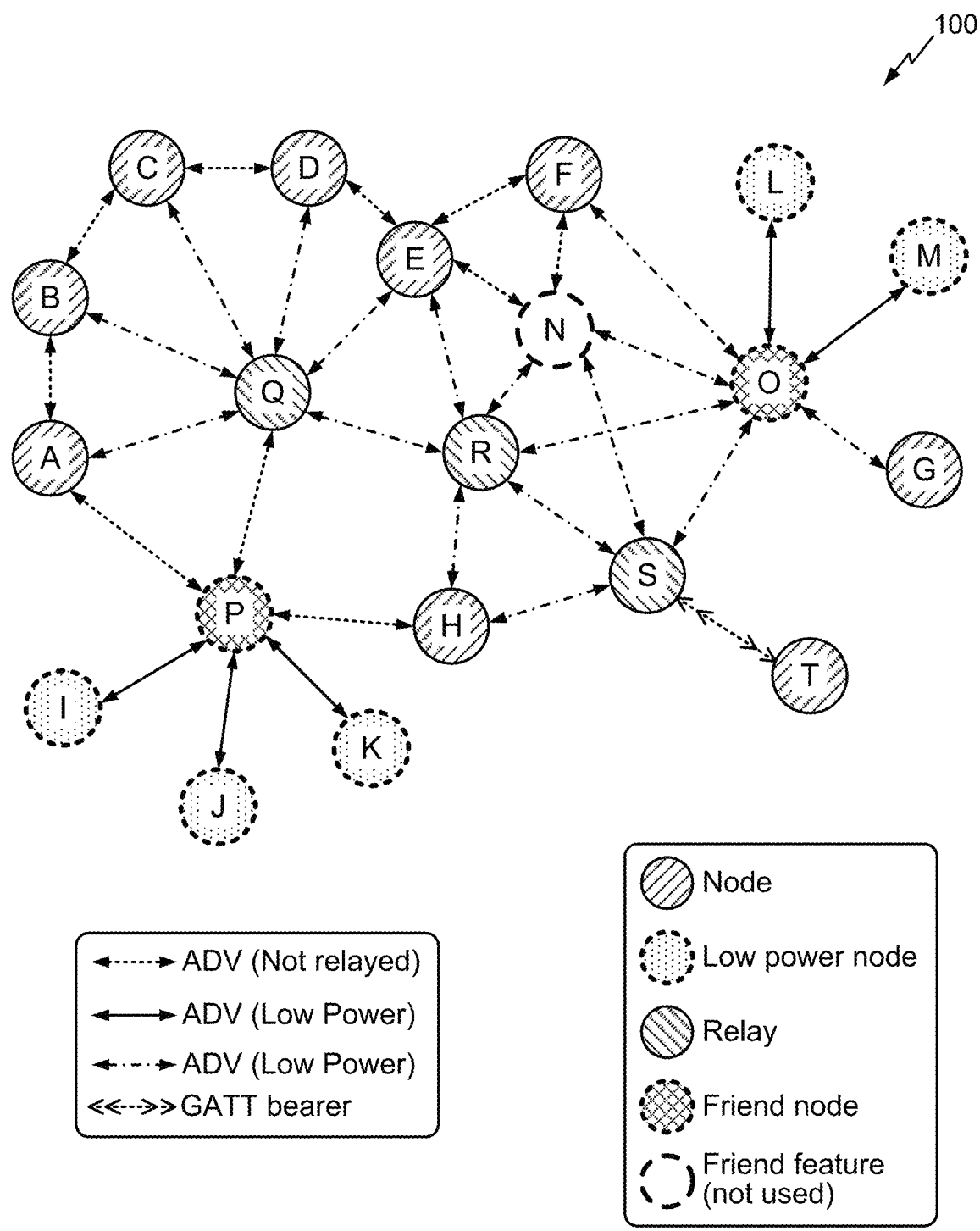
FIG. 1A illustrates a mesh network according to aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to traffic management in mesh networks. Specifically, disclosed aspects involve systems and methods for dynamically configuring the network traffic, in a manner which increases message reliability and reduces message redundancy. Aspects of this disclosure include a supervisor provisioned, for example, at one or more nodes of an exemplary SigMesh network. The supervisor may be implemented with an appropriate combination of software, hardware, and firmware, and configured to collect information from the SigMesh and build a model of the SigMesh networks' traffic topology. Based on this model, the supervisor may configure the above-described parameters (e.g., transmit count, transmit interval, relay retransmit count, relay retransmit interval, etc.) for nodes of the SigMesh network, in a manner which dynamically enhances the efficiency and reduces congestion of traffic in the SigMesh network.

Figure 1B:
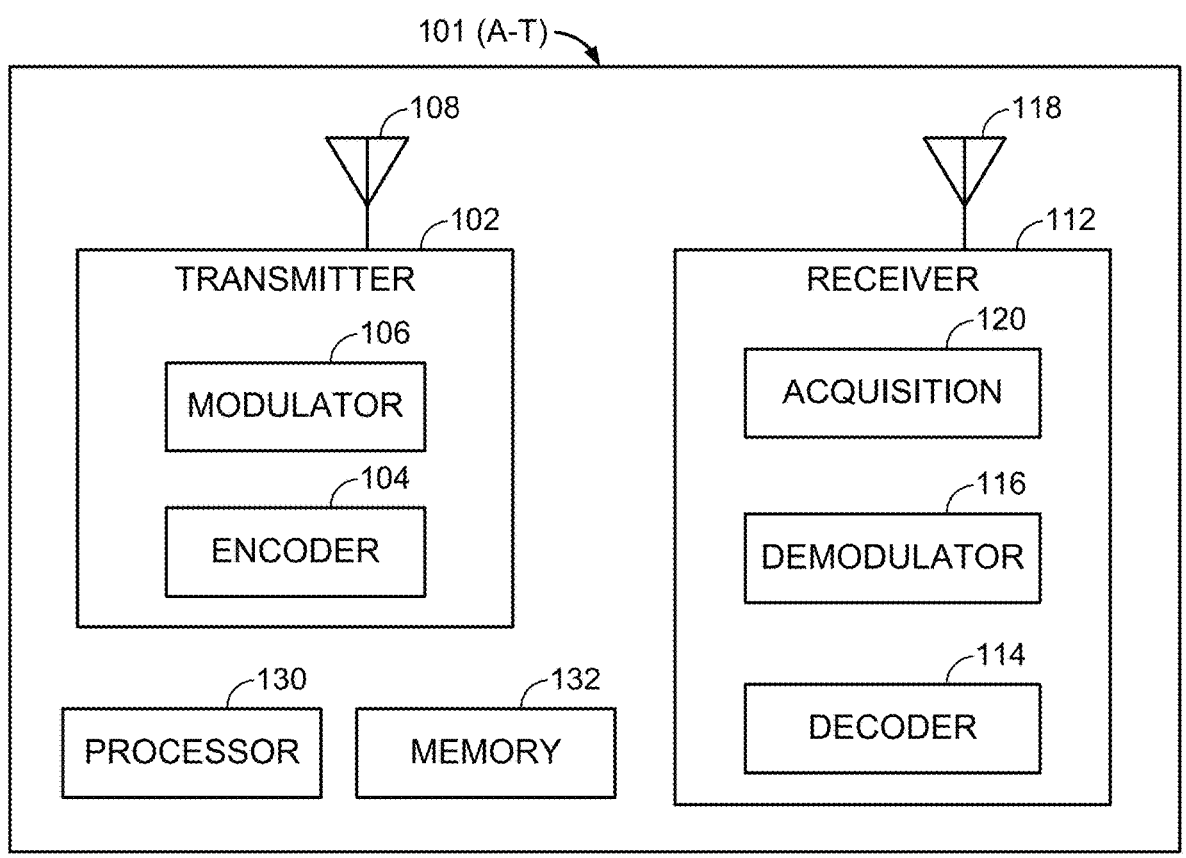
FIG. 1B illustrates the configuration of one or more devices at nodes of the mesh network of FIG. 1A.

With reference now to FIGS. 1A-B, a simplified schematic diagram of an exemplary mesh network 100 is illustrated in FIG. 1A. Mesh network 100 may be configured as a Bluetooth SigMesh network in exemplary aspects, and may include several nodes of which nodes A-T have been exemplarily shown. Although some solid lines and some dashed lines have been illustrated to indicate possible communication paths between some of the nodes A-T, it will be understood that any other communication path supported by relevant standards/specifications may be supported by mesh network 100.

To facilitate further understanding of mesh network 100, an example deployment of some of the nodes A-T will be discussed, without imposing any restrictions on the scope of aspects of this disclosure. Accordingly, in one example, mesh network 100 may be a home network (e.g., Bluetooth SigMesh), wherein node Q may include a switch (or "switch Q") and node R may include a light (or "light R"). It may be possible for devices (e.g., mobile phones, or other example user devices discussed with reference to FIG. 1B) at several of the nodes A-E to control light R from switch Q. As can be noticed, switch Q may be surrounded by several such nodes A-E, which means that each of these nodes A-E may be able to transmit messages to switch Q for controlling light R, for example. If a network parameter such as the transmit count is set to be a relatively small number while switch Q is surrounded with a large number of such nodes A-E, then the likelihood of message collision from the nodes A-E may be high. This means that messages from nodes A-E may collide and fail to be injected into mesh network 100. However, increasing the transmit count to a large value with a view to increasing the possibility of message injection into mesh network 100 would also be detrimental because the noise (from a large number of redundant messages) would increase in mesh network 100, leading to poor user experience at the various nodes. Furthermore, it will be recognized that the nodes A-E, for example, may not be stationary, and so may be mobile and relocate frequently. This means that the neighbors for nodes may be in flux, and as such have an unpredictable effect on the traffic and message injection likelihood.

There may also be one or more relay nodes through which messages may be transmitted through mesh network 100. For instance, switch G may be used control a device at node R, through various intermediate nodes, such as node O to relay the messages from switch G to node R. Node O may be an edge node to connect switch G in this manner, and the setting of the relay count for mesh network 100 may affect the likelihood of the relay message being injected into mesh network 100.

FIG. 1B shows an example configuration of devices which may be located at corresponding nodes A-T of mesh network 100, which may be wireless communication devices, and generally designated by the reference numeral 101. Device 101 may support communication of Bluetooth or BLE signals, and as such, include transmitter 102 and receiver 112, whose functionalities may be merged without loss of generality.

Exhaustive details of transmitter 102 and receiver 112 have been omitted for the purposes of this discussion, as skilled persons will recognize detailed configurations of these devices. As shown, transmitter 102 includes encoder 104 configured to encode information to be transmitted into a protocol-specific packet format. Modulator 106 is configured to modulate the transmitted bits to corresponding symbols, which are used to modulate a carrier at the carrier frequency of communication paths in mesh network 100, and antenna 108 is configured to transmit wireless signals comprising the modulated carrier on the communication paths. On the receiving end, receiver 112 may comprise antenna 118 configured to receive the wireless signals from the communication paths of mesh network 100. Acquisition block 120 may include functionality for detecting whether the wireless signals received are intended for device 101, e.g., based on acquisition thresholds adapted to signal strength of the wireless signals received on the communication paths. Symbols of the wanted signals are demodulated in demodulator 116, and decoded in decoder 114 in order to retrieve the received information. Also illustrated are processor 130 and memory 132 in device 101, which may be configured to respectively perform the below computations and store information in exemplary aspects.

Figure 2A:
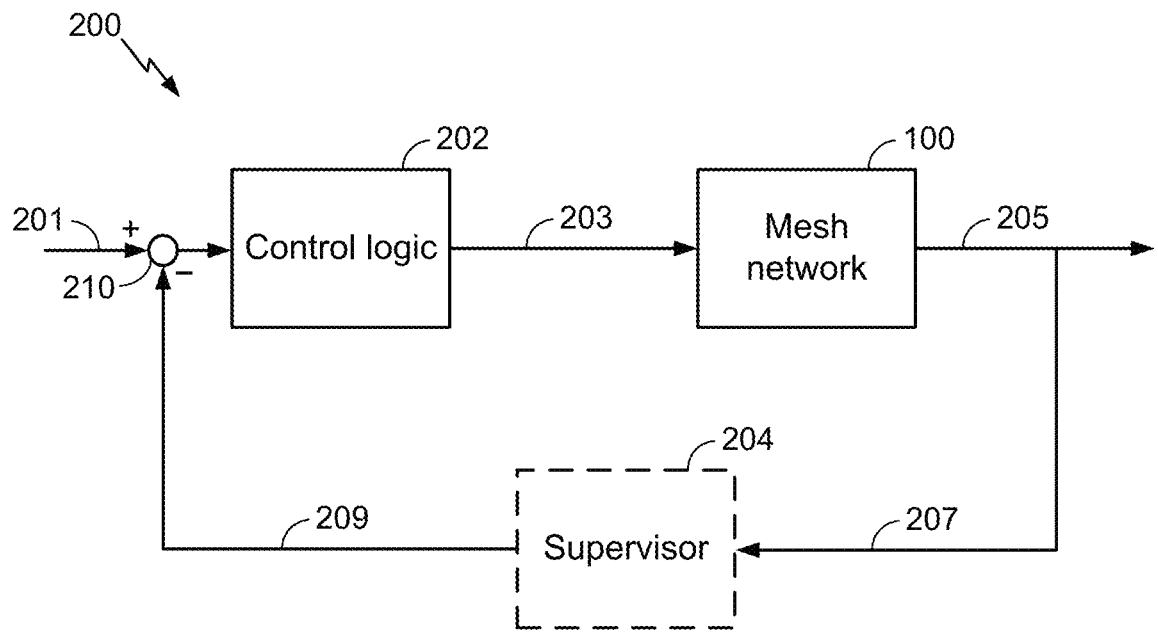
FIGS. 2A-B illustrate a supervisor for monitoring network parameters, according to aspects of this disclosure.
Figure 2B:
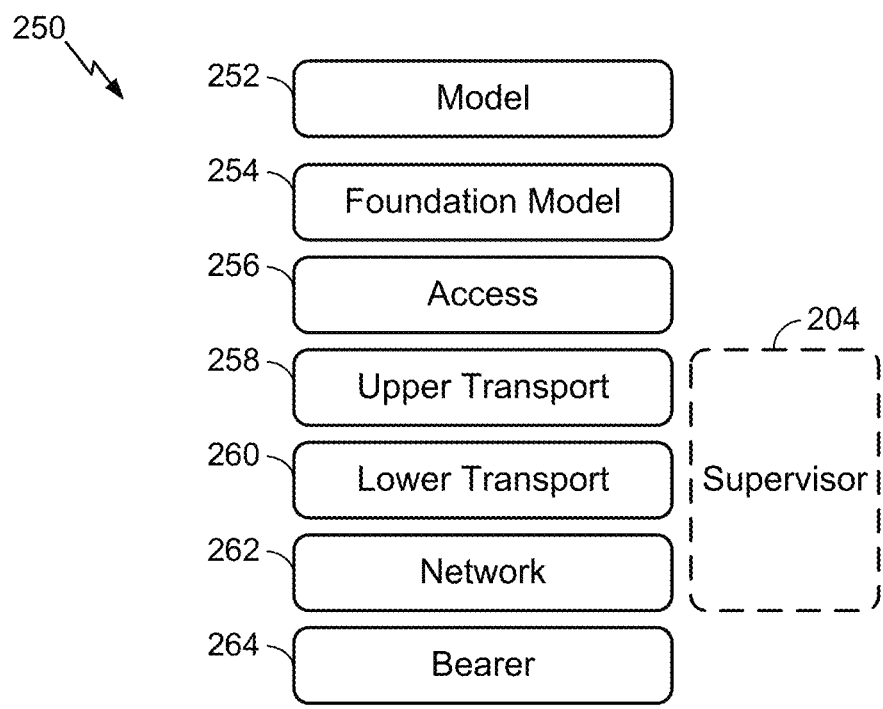

With reference now to FIGS. 2A-B, aspects of the exemplary supervisor in SigMesh networks will be discussed. FIG. 2A illustrates a schematic view of system 200 in which supervisor 204 is deployed to manage and improve traffic of mesh network 100. Supervisor 204, as previously mentioned, may include any combination of hardware, software, or firmware. In one aspect, supervisor 204 may be deployed in one or more existing nodes A-T of mesh network 100, while system 200 may also be a standalone module. As shown, system 200 may receive initial network parameters via path 201. Control logic 202 may be configured to initially transmit message packets on path 203 based on the initial network parameters, to mesh network 100 or a node thereof. The message packets may be retransmitted, relayed, or injected into mesh network 100 via path 205. Unlike conventional systems which lack a feedback path, in the illustrated exemplary aspect, system 200 also includes feedback path 207 from path 205, feeding into supervisor 204. Supervisor 204 may adjust the network parameters according to exemplary techniques (which will be discussed in further detail below) and provide the adjusted network parameters via path 209. The initial network parameters on path 201 may be adjusted or modified in block 210 based on the adjusted network parameters suggested on path 209 from supervisor 204, and control logic 202 may then modify its transmission of message packets to path 203 using the adjusted network parameters. The above process may be reiterated to accommodate dynamic changes in the network traffic real time.

The following network parameters, which were previously mentioned, are considered in one example, while supervisor 204 may be configured to monitor and adjust any other network parameter on similar lines as above: "transmit count" refers to the number of message transmissions of the same packet originating from a node; "network transmit interval" refers to the time interval between successive messages transmitted from the node; "relay retransmit count" refers to the number of message retransmissions of the same packet by a relay node; and "relay retransmit interval" refers to the time interval between two consecutive messages to be relayed by the relay node. In one aspect, the above parameters are initially supplied on path 201. Supervisor 204 collects information regarding the topology of mesh network 100 and message identity of messages flowing into path 205 from the feedback received via feedback path 207, and creates suggestions for updating the above parameters in a dynamic manner to improve real time traffic conditions.

FIG. 2B shows a network architecture 250 in which supervisor 204 may be implemented to perform the above-described functions. Layers 252-264 represent layers of network architecture 250, according to the SigMesh specification for Bluetooth networks, which will be further described below, as applicable to aspects of this disclosure.

Specifically, layer 252 is a model layer, which defines models that are used to standardize the operation of typical user scenarios and are defined in the Bluetooth Mesh Model (e.g., SigMesh) specification or other higher layer specifications. Examples of higher layer model specifications include models for lighting and sensors.

Layer 254 is a foundation model layer, which defines the states, messages, and models required to configure and manage a mesh network.

Layer 256 is an access layer, which defines how higher layer applications can use the upper transport layer. The access layer defines the format of application data, and defines and controls the application data encryption and decryption performed in the upper transport layer. The access layer also checks whether the incoming application data has been received in the context of the right network and application keys before forwarding it to the higher layer.

Layer 258 is an upper transport layer, which encrypts, decrypts, and authenticates application data and is designed to provide confidentiality of access messages. It also defines how transport control messages are used to manage the upper transport layer between nodes, including when used by the Friend feature.

Layer 260 is a lower transport layer, which defines how upper transport layer messages are segmented and reassembled into multiple Lower Transport protocol data units (PDUs) to deliver large upper transport layer messages to other nodes. The lower transport layer also defines a single control message to manage segmentation and reassembly.

Layer 262 is a network layer, which defines how transport messages are addressed towards one or more elements. The network layer defines the network message format that allows Transport PDUs to be transported by the bearer layer. The network layer decides whether to relay/forward messages, accept them for further processing, or reject them. The network layer also defines how a network message is encrypted and authenticated.

Layer 264 is a bearer layer, which defines how network messages are transported between nodes. There are two bearers defined, the advertising bearer and the generic attribute (GATT) bearer. Additional bearers may be defined in the future.

In one example, supervisor 204 may be deployed to straddle the network layer 262, lower transport layer 260, and upper transport layer 258. Thus, supervisor 204 may observe the messages which are sent out on path 205 through feedback path 207 and determine whether one or more of the above network parameters are to be adjusted. For instance, supervisor 204 may monitor the transmit count, transmit interval, relay retransmit count, relay retransmit interval, etc., based on the messages that are transmitted on path 205, and determine whether adjusting one or more of the above network parameters would reduce traffic congestion and/or ensure injection (or alternatively, improve likelihood of injection) into mesh network 100. Accordingly, supervisor 204 may provide feedback via path 209 with suggestions on modifying one or more of the above network parameters. Control logic 202 may modify the initial parameters from path 201 with the suggestions from path 209 and utilize the modified network parameters for future transmission. In this manner, supervisor 204 may advantageously perceive the local network density, and dynamically adjust transmit/relay counts and transmit/relay retransmit intervals according to the traffic status.

The above deployment of supervisor 204 may be modified for specific network needs and so is very flexible and robust to network transience, packet loss, and potential disconnections between nodes. Supervisor 204 may also be advantageously used for flood suppression based on the ability to scale the transmission/relay rates with network density. For instance, network flooding may be selectively suppressed in a dense and noisy environment to reduce network congestion and increase the success rate of data transmission.

The exemplary supervisor 204 configuration is also recognized as being energy-efficient based on the dynamic modification of the transmit/relay retransmit intervals and flood suppression mechanisms, which in turn reduce the active time of one or more nodes of the SigMesh network. Thus, exemplary techniques are suitable for use in battery powered devices, e.g., in the IoT systems. The above-described techniques may be implemented with relatively small software code size and memory space, as will be evidenced by exemplary algorithms which may be used for controlling message transmission, explained with reference to FIG. 3 below.

Figure 3:
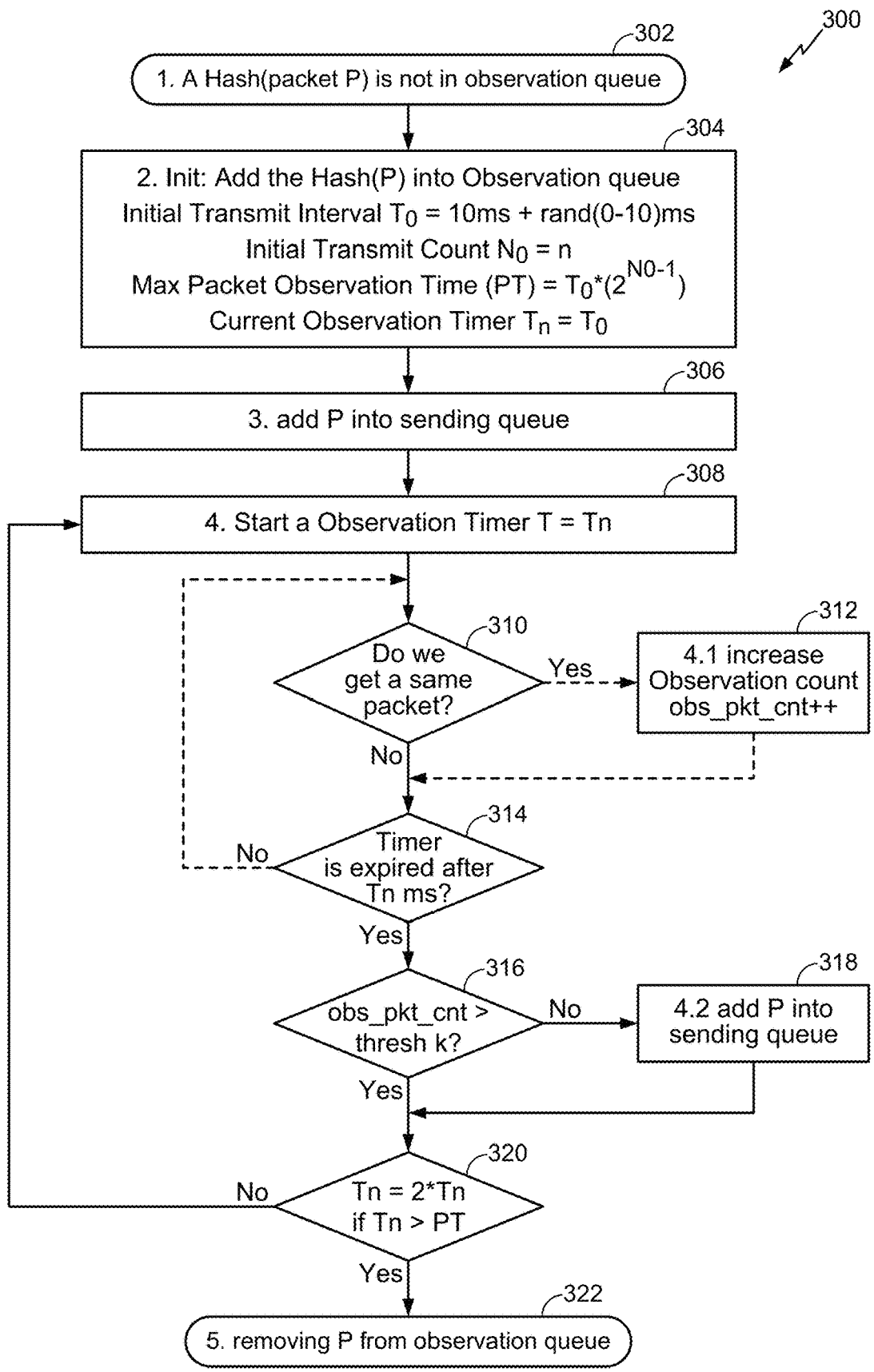
FIG. 3 illustrates a process for determining network parameters, according to aspects of this disclosure.

With reference to FIG. 3, an exemplary method 300 for controlling packet transmission on to a SigMesh network is shown. Method 300 may be implemented by supervisor 204 in conjunction with control logic 202 of FIG. 2A in one example. The following process will be discussed with combined reference to system 200 of FIG. 2A.

In block 302, a message packet P (alternatively referred to as a hash) may be sent out on path 205, and observed by supervisor 204 via feedback path 207. An observation queue (not shown separately) may be implemented by supervisor 204 to store message packets which are being observed for the purposes of monitoring the traffic on mesh network 100. As such, if in block 302, it is determined that packet P is not currently being monitored, method 300 will proceed to block 304 (while noting that if packet P is already being observed, then the remaining blocks in method 300 will be relevant to this condition).

In block 304, packet P is added to the observation queue and values for initial transmit interval $T_0$ and transmit count No are obtained (e.g., as received from path 201). A maximum observation window or packet observation time (PT) is set, and an observation timer $T_n$ is initialed to the initial transmit interval $T_0$.

In block 306, the packet P may be added into a sending queue, and in block 308, the observation timer is started. In this regard, each new packet P is added into the sending queue to be sent out when scheduled (e.g., immediately, or after a wait). When the timer started in block 308 expires, the following blocks will determine if the packet P should be retransmitted (block 318) or the process is complete and packet P is removed from the observation queue (block 322). In block 310, it is determined whether the same packet P is received again, and if so, in block 312, the observation count of the packet P (or packet count) is increased. Otherwise, from block 312, method 300 proceeds to block 314, wherein the timer's expiration is checked to see if it has expired after the time $T_n$, and if the timer has not expired, then the process stays in block 310 to see if the same packet P is observed. In this way, the number of transmissions (or retransmissions), and the interval after which a packet is retransmitted, are monitored for the duration of the timer.

In block 316, once the timer expires after the initial time interval $T_n$, the packet count is checked to see if it is greater than a pre-specified threshold k, and if not, the packet P is added to the sending queue in block 318 to be injected into mesh network 100. If the packet count is greater than the threshold k, then the time interval $T_n$ is increased (e.g., doubled) in block 320 and the process from block 308 onwards is repeated until the time interval exceeds the maximum observation time PT. Once the timer exceeds the maximum observation time PT, the packet P is removed from the observation queue. In this way, for each packet, if it has been observed to be retransmitted more than a threshold number of times within a particular period of observation, the sending of the packet is delayed by leaving the packet P in the sending queue. Thus, flooding is avoided by preventing too many retransmissions. Moreover, if the packet P is not sent, then it is provided an opportunity to be transmitted, preventing the likelihood that it is lost due to a collision, for example.

Figure 4:
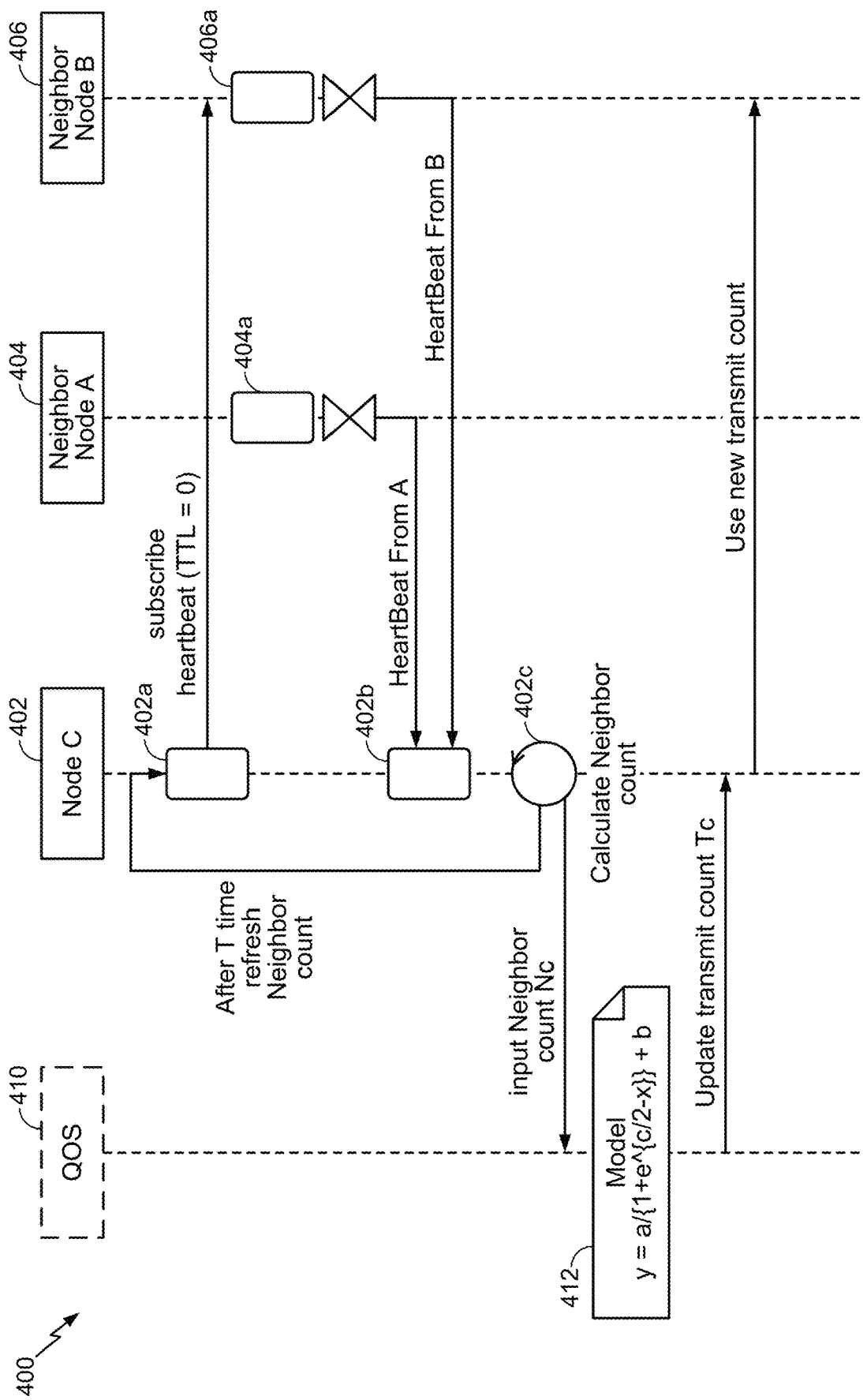
FIG. 4 illustrates an exemplary method determining a neighbor count, according to aspects of this disclosure.

With reference now to FIG. 4, system 400 showing aspects of a SigMesh network will be discussed. More specifically, system 400 illustrates exemplary aspects of calculating initial values of one or more network parameters, such as the transmit and relay counts, by supervisor 204. In this regard, the initial values may be based on a neighbor node count, as will be explained below.

Supervisor 204 is shown as node C 402 in this case, which may have several neighbors, among which neighbor node A 404 and neighbor node B 406 have been identified to aid in the following description. In order to determine the number of neighboring nodes for building a model of the network's topology, node C 402 may employ a Heartbeat model.

In the Heartbeat model, the time to live (TTL) of packets, e.g., in SigMesh networks (e.g., using Bluetooth or BLE bearers) is a field in the mesh network's protocol data units (PDUs) which is used to control whether or not a received message should be relayed, with a view to limiting the total number of hops over which a message is ultimately relayed within the network. A value of zero for the TTL indicates that a message has not been relayed and should not be relayed. This means that a node can send a message to other nodes which are in direct radio range (i.e., the neighbors) and indicate that receiving node(s) should not relay the message. If a message is sent with a TTL of 2 or more, then each time the message is relayed, the TTL value is decremented. A value of 1 for the TTL means that the message may have been relayed at least once, but that it should not be relayed again.

Thus, to determine the neighbor nodes count, a TTL value of zero (0) is used in an aspect, to avoid message relays. Neighbor node C 402 sends out a subscribe Heartbeat message with TTL=0 at 402a. In the Heartbeat model, wherein the network nodes can be configured to send a message known as a Heartbeat message, periodically, neighbor node A 404 sends a Heartbeat message at 404a and neighbor node B 406 sends a Heartbeat message at 406a, which are received at 402b by node C 402. The purpose of the Heartbeat message is to indicate to other nodes that the node sending the Heartbeat message is still active and to allow its distance from the recipient to be determined, in terms of the number of hops needed to deliver the Heartbeat message.

At 402c, node C 402 calculates the neighbor node count Nc. By determining the neighbor count Nc, the neighbor count may be input into model 412, for example, to use a logistic curve and choose a transmit count Tc, which would represent the best initial transmit count for node C 402. Model 412 may receive the quality of service (QOS) 410 of the network in an optional aspect. With a as an upper limit of Tc, b as a lower limit of Tc, c as the largest number of nodes in a predetermined radius, the following equation holds for model 412:

$$T_c = \frac{a}{1 + e^{e/2-x}} + b$$

A simulation graph may be employed for the transmit count within a radius of 10 nodes, for example, such that as Tc increases, Nc will increase until an upper limit is reached. Accordingly, by determining the neighbor count Nc, node C 402 or supervisor 204 may determine and update the transmit count to be used in the exemplary aspects discussed herein.

Figure 5:
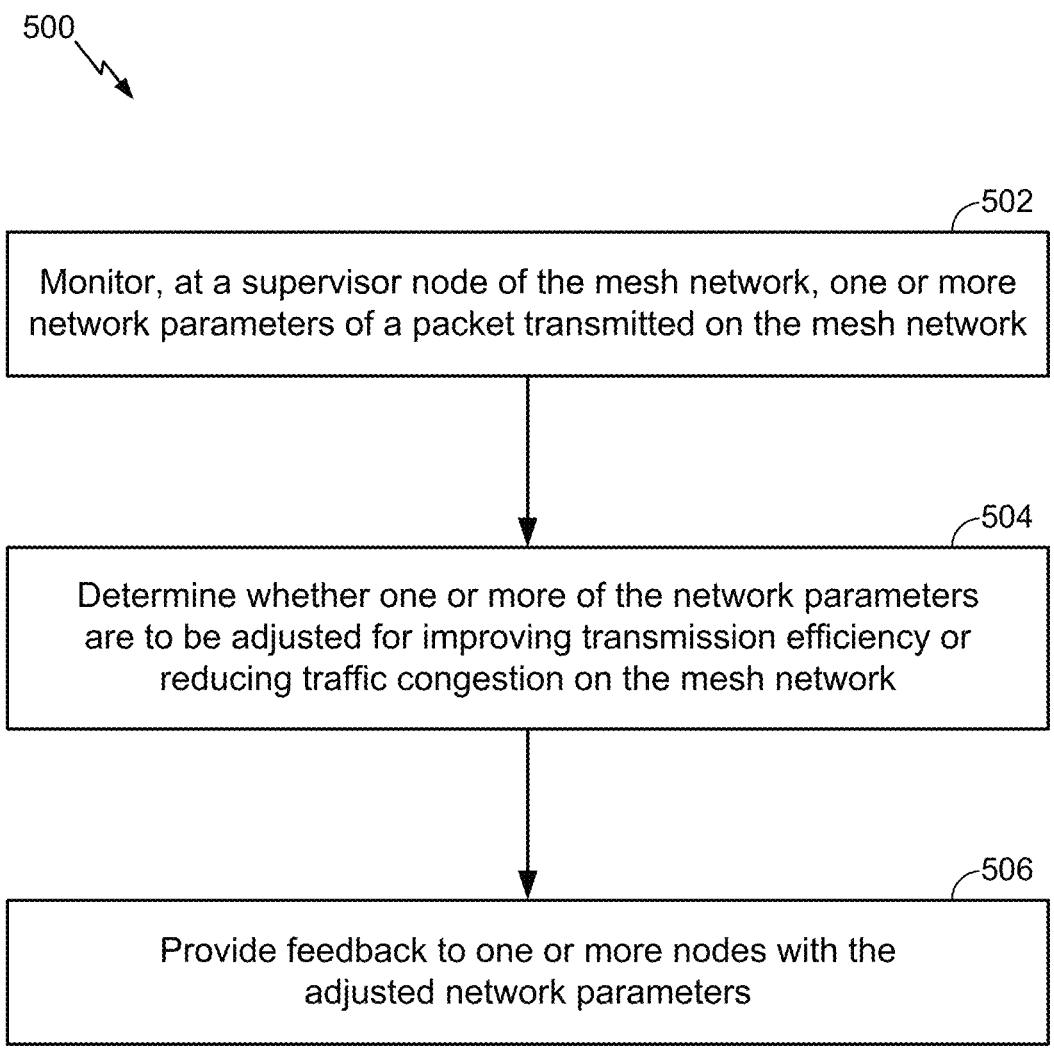
FIG. 5 illustrates a method of managing traffic in a mesh network, according to aspects of this disclosure.

It will be appreciated that exemplary aspects include various methods for performing the processes, functions and/or algorithms disclosed herein. For example, FIG. 5 illustrates a method 500 of managing a mesh network (e.g., mesh network 100).

Block 502 comprises monitoring, at a supervisor node (e.g., supervisor 204, from feedback path 207) of the mesh network, one or more network parameters of a packet transmitted on the mesh network (e.g., monitoring packet count, transmission intervals in method 300).

Block 504 comprises determining whether one or more of the network parameters are to be adjusted for improving transmission efficiency or reducing traffic congestion on the mesh network (e.g., determining in block 316 of method 300 whether the number of retransmissions of the same packet is greater than a threshold).

Block 506 comprises providing feedback to one or more nodes with the adjusted network parameters (e.g., providing feedback via path 209 to control logic 202 of a node to adjust its message transmission).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method for managing traffic in a mesh network. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of managing a mesh network, the method comprising:
monitoring, at a supervisor of the mesh network, one or more network parameters of the mesh network;
determining, whether the one or more network parameters are to be adjusted for improving transmission efficiency or reducing traffic congestion on the mesh network;
providing feedback to one or more nodes with the adjusted network parameters;
determining, by the supervisor, a neighbor node count based on a heartbeat model; and
determining initial values of the one or more network parameters based on the neighbor node count.

2. The method of claim 1, wherein the one or more network parameters include one or more of a topology, message identity, transmit count, transmit interval, relay retransmit count, or relay retransmit interval.

3. The method of claim 1, wherein reducing traffic congestion comprises reducing or avoiding flooding of packets in the mesh network.

4. The method of claim 1, wherein improving transmission efficiency comprises ensuring injection of packets in the mesh network.

5. The method of claim 1, wherein improving transmission efficiency comprises reducing active time of one or more nodes of the mesh network based on the feedback.

6. The method of claim 1, wherein the mesh network is a Bluetooth Special Interest Group mesh (SigMesh) network.

7. An apparatus configured to manage a mesh network, the apparatus comprising:
    control logic configured to transmit packets on to the mesh network based on one or more network parameters;
    a supervisor of the mesh network configured to monitor the one or more network parameters of the mesh network based on the packets transmitted on to the mesh network, and determine whether the one or more network parameters are to be adjusted;
    a feedback path to the control logic with the adjusted network parameters;
    wherein the supervisor is further configured to determine a neighbor node count based on a heartbeat model and determine initial values of the one or more network parameters based on the neighbor node count.

8. The apparatus of claim 7, wherein the one or more network parameters include one or more of a topology, message identity, transmit count, transmit interval, relay retransmit count, or relay retransmit interval.

9. The apparatus of claim 7, wherein the adjusted network parameters are provided to reduce traffic congestion based on reducing or avoiding flooding of packets in the mesh network.

10. The apparatus of claim 7, wherein the adjusted network parameters are provided to ensure injection of packets in the mesh network.

11. The apparatus of claim 7, wherein the mesh network is a Bluetooth Special Interest Group mesh (SigMesh) network.

12. An apparatus comprising:
    means for monitoring one or more network parameters of a mesh network;
    means for determining, whether the one or more network parameters are to be adjusted for improving transmission efficiency or reducing traffic congestion on the mesh network; and
    means for providing feedback to one or more nodes with the adjusted network parameters;
    means for determining a neighbor node count of the apparatus based on a heartbeat model; and
    further comprising means for determining initial values of one or more network parameters based on the neighbor node count.

13. The apparatus of claim 12, wherein the one or more network parameters include one or more of a topology, message identity, transmit count, transmit interval, relay retransmit count, or relay retransmit interval.

14. The apparatus of claim 12, wherein the means for reducing traffic congestion comprises means for reducing or avoiding flooding of packets in the mesh network.

15. The apparatus of claim 12, wherein the means for improving transmission efficiency comprises means for ensuring injection of packets in the mesh network.

16. The apparatus of claim 12, wherein the means for improving transmission efficiency comprises means for reducing active time of one or more nodes of the mesh network based on the feedback.

17. The apparatus of claim 12, wherein the mesh network is a Bluetooth Special Interest Group mesh (SigMesh) network.

18. A non-transitory computer-readable storage medium comprising code, which, when executed by a processor, causes the processor to perform operations for managing a mesh network, the non-transitory computer-readable storage medium comprising:
    code for monitoring, at a supervisor of the mesh network, one or more network parameters of the mesh network;
    code for determining, whether the one or more network parameters are to be adjusted for improving transmission efficiency or reducing traffic congestion on the mesh network;
    code for providing feedback to one or more nodes with the adjusted network parameters;
    code for determining, by the supervisor, a neighbor node count based on a heartbeat model; and
    code for determining initial values of one or more network parameters based on the neighbor node count.

19. The non-transitory computer-readable storage medium of claim 18, wherein the one or more network parameters include one or more of a topology, message identity, transmit count, transmit interval, relay retransmit count, or relay retransmit interval.

20. The non-transitory computer-readable storage medium of claim 18, wherein reducing traffic congestion comprises code for reducing or avoiding flooding of packets in the mesh network.

21. The non-transitory computer-readable storage medium of claim 18, wherein improving transmission efficiency comprises code for ensuring injection of packets in the mesh network.

22. The non-transitory computer-readable storage medium of claim 18, wherein improving transmission efficiency comprises code for reducing active time of one or more nodes of the mesh network based on the feedback.

23. The non-transitory computer-readable storage medium of claim 18, wherein the mesh network is a Bluetooth Special Interest Group mesh (SigMesh) network.

* * * * *